United States Patent
Seidel et al.

(10) Patent No.: US 6,828,366 B2
(45) Date of Patent: Dec. 7, 2004

(54) FLAME-RESISTANT POLYCARBONATE MOULDING COMPOUNDS

(75) Inventors: Andreas Seidel, Dormagen (DE); Thomas Eckel, Dormagen (DE); Bernd Keller, Geldern (DE); Dieter Wittmann, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 115 days.

(21) Appl. No.: 10/220,646

(22) PCT Filed: Feb. 21, 2001

(86) PCT No.: PCT/EP01/01925

§ 371 (c)(1),
(2), (4) Date: Sep. 3, 2002

(87) PCT Pub. No.: WO01/66635

PCT Pub. Date: Sep. 13, 2001

(65) Prior Publication Data

US 2003/0105196 A1 Jun. 5, 2003

(30) Foreign Application Priority Data

Mar. 6, 2000 (DE) .......... 100 10 941

(51) Int. Cl.[7] .............. C08K 3/22; C08K 3/34; C08K 5/523

(52) U.S. Cl. .............. 524/127; 524/437; 524/451

(58) Field of Search .............. 524/127, 437, 524/451

(56) References Cited

U.S. PATENT DOCUMENTS

| | | | |
|---|---|---|---|
| 5,061,745 A | 10/1991 | Wittmann et al. | 524/139 |
| 5,204,394 A | 4/1993 | Gosens et al. | 524/125 |
| 5,672,645 A | 9/1997 | Eckel et al. | 524/127 |
| 5,750,602 A * | 5/1998 | Kohler et al. | 524/127 |
| 5,849,827 A | 12/1998 | Bödiger et al. | 521/423 |
| 5,864,004 A * | 1/1999 | Kim et al. | 524/142 |
| 5,871,570 A * | 2/1999 | Koyama et al. | 106/18.18 |
| 5,994,463 A * | 11/1999 | Eckel et al. | 525/67 |
| 6,174,943 B1 * | 1/2001 | Matsumoto et al. | 524/115 |
| 6,613,820 B2 * | 9/2003 | Fujiguchi et al. | 524/109 |

FOREIGN PATENT DOCUMENTS

| | | |
|---|---|---|
| DE | 19 734 661 | 2/1999 |
| DE | 19 801 198 | 7/1999 |
| DE | 19 960 316 | 5/2000 |
| DE | 19 914 139 | 9/2000 |
| EP | 0 391 413 | 10/1990 |
| EP | 0 754 531 | 1/1997 |
| EP | 0767 204 * | 4/1997 |
| JP | 11-199768 | 7/1999 |
| WO | 99/43747 | 9/1999 |
| WO | 99/57198 | 11/1999 |

* cited by examiner

Primary Examiner—Peter Szekely
(74) Attorney, Agent, or Firm—Joseph C. Gil; Aron Preis

(57) ABSTRACT

A thermoplastic molding composition characterized by its excellent flame retardance, chemical resistance and thermal stability is disclosed. The compostion that contains polycarbonate, an impact modifier and a flame retardant corresponding to (I)

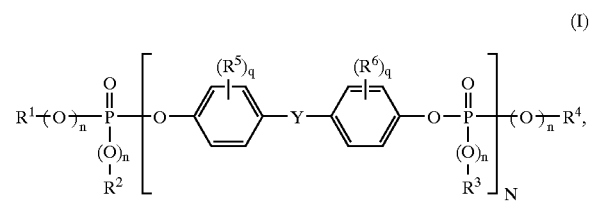

in which $R^1$, $R^2$, $R^3$ and $R^4$ independently of one another denote $C_1$–$C_8$-alkyl, $C_6$–$C_{10}$-aryl or $C_7$–$C_{12}$-aralkyl, n is 0 or 1, q is 0, 1, 2, 3, or 4, N is 0.1 and 30, $R^5$ and $R^6$ independently denote $C_1$–$C_4$-alkyl, and Y denotes $C_1$–$C_7$-alkylidene, $C_1$–$C_7$-alkylene, $C_5$–$C_{12}$-cycloalkylene, $C_5$–$C_{12}$-cycloalkylidene, —O—, —S—, —SO—, $SO_2$ or —CO—, is further characterized in that is contains $\leq 0.1\%$ fluorine, in relation to its weight.

9 Claims, No Drawings

FLAME-RESISTANT POLYCARBONATE MOULDING COMPOUNDS

The present invention relates to impact-modified polycarbonate compositions having a low fluorine content which are distinguished by excellent flame resistance even at low wall thickness, as well as exceptionally good chemical and heat resistance.

Impact-modified polycarbonate moulding compositions which are rendered flame-resistant in chlorine-free, bromine-free manner are known.

EP-A 0 345 522 describes polymer mixtures prepared from aromatic polycarbonate, ABS graft polymer and/or copolymer which comprises styrene, which are rendered flame-resistant with monophosphoric acid esters. In addition the polymer mixtures contain Teflon at a concentration of 0.3 wt. % as a drip-prevention agent.

U.S. Pat. Nos. 5,204,394 and 5,672,645 describe PC/ABS moulding compositions which are rendered flame-resistant by oligophosphoric acid ester and mixtures of oligophosphoric and monophosphoric acid ester, respectively. The moulding compositions described also contain as a drip-prevention agent Teflon used at concentrations of from 0.2 to 0.5 parts by weight, in relation to 100 parts by weight of the moulding composition without Teflon.

JP-A 111 997 68 describes PC/ABS blends which are rendered flame-resistant with monomeric and oligomeric phosphoric acid esters, with the flame resistance being improved markedly by the addition of an inorganic filler such as, for example, talc. Teflon, at concentrations of from 0.2 to 0.5 parts by weight, in relation to 100 parts by weight of PC+ABS, must also be added to these moulding compounds in order to prevent the dripping of burning material. In each case this corresponds to a Teflon concentration of >0.15 wt. %. JP-A 111 997 68 also discloses a flame-resistant PC/ABS moulding composition based on triphenyl phosphate as the flame retardant, which even without the addition of Teflon meets the V-0 standard in the UL94 V test. This moulding composition contains stabilised red phosphorus and larger quantities of talc which affect the mechanical properties and the inherent colour of the polymer blend to great disadvantage.

U.S. Pat. No. 5,849,827 describes PC/ABS moulding compositions which are rendered flame-resistant with resorcinol-based oligophosphate, with the afterburning times being reduced markedly by the addition of nanoscale inorganic materials at low concentrations. Experience shows that the tendency to drip burning material is not reduced by the nanoparticles, such that the addition of drip-prevention agents such as, for example, Teflon continues to be necessary in order to meet the V-0 standard in the UL94 V test.

WO 99/07782 describes PC/ABS moulding compositions which are rendered flame-resistant with a special oligophosphate derived from bisphenol A and which contain additionally synergistic quantities of a nanoscale inorganic compound. The moulding compositions are distinguished by improved resistance to environmental stress cracking (ESC) and high heat resistance. The moulding compositions contain Teflon at a concentration of 0.35%.

EP-A 0 754 531 also describes, inter alia, flame-resistant PC/ABS moulding compositions which are rendered flame-resistant with oligophosphates of the bisphenol A type or methyl-substituted derivatives thereof and comprise flake-form fillers such as mica and/or glass flakes, optionally also in combination with glass fibres. The moulding compositions described do not contain Teflon. They are distinguished by good stiffness and dimensional stability (low warpage) and show negligible plate-out when processed by injection moulding. No information as to the quality of the flame resistance of the PC/ABS moulding compositions, in particular regarding the tendency to drip burning material, is disclosed. The high inorganic filler content of the moulding compositions described affects negatively some mechanical properties. This results, for example, in a degree of impact strength which for many applications is inadequate.

In some plastics applications, in particular in some areas within the electrical and electronics industry, safety considerations dictate customer requirements or even legal requirements for a restriction not only of the chlorine and bromine content, but also of the fluorine content. Thus, for example, a material is deemed to be "halogen-free" in accordance with DIN/VDE standard 0472, Part 815 only when the percentages by mass of the halogens chlorine, bromine and iodine, calculated as chlorine, are $\leq 0.2\%$ and the proportion by mass of fluorine is furthermore $\leq 0.1\%$.

WO 99/57198 describes PC/ABS moulding compositions which are rendered flame-resistant with a resorcinol-derived oligophosphate (RDP) and are classified as halogen-free in accordance with VDE/DIN 0472, Part 815 by virtue of their low Teflon content of only 0.1—corresponding to a fluorine content of 0.076%. Such moulding compositions, however, have poor resistance to ESC and inadequate heat resistance, as well as a melt stability which is frequently inadequate, in particular for extrusion applications.

The object of the present invention was to provide a moulding composition which conforms to VDE/DIN standard 0472, Part 815, having a fluorine content of $\leq 0.1\%$, which is distinguished by excellent flame resistance, good mechanical properties, improved beat resistance and improved resistance to ESC, and which by virtue of its rheological properties (melt viscosity and melt stability) is also usable for extrusion applications.

It has now been found that impact-modified polycarbonate compositions which are rendered flame-resistant with special oligophosphates derived from bisphenol A or analogous diols and which optionally additionally contain small quantities of inorganic materials show the desired property profile.

The present invention consequently provides polycarbonate compositions containing A) at least one aromatic polycarbonate or polyester carbonate,
B) at least one impact modifier and
C) at least one phosphorus compound corresponding to the general formula (I)

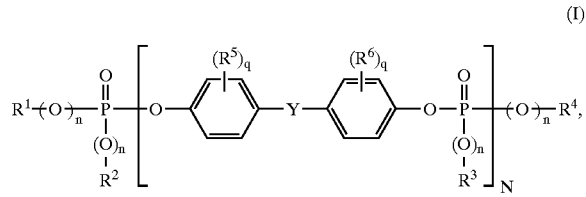

in which
$R^1$, $R^2$, $R^3$ and $R^4$ in each case independently of one another denote $C_1$–$C_8$-alkyl and/or optionally alkyl-substituted $C_5$–$C_6$-cycloalkyl, $C_6$–$C_{10}$-aryl or $C_7$–$C_{12}$-aralkyl, n independently of one another denotes 0 or 1, q independently of one another denotes 0, 1, 2, 3 or 4, N denotes a number between 0.1 and 30, preferably between 0.5 and 10, in particular between 0.7 and 5, $R^5$ and $R^6$ independently of one another denote $C_1$–$C_4$-alkyl, preferably methyl, and Y denotes $C_1$–$C_7$-alkylidene, $C_1$–$C_7$-alkylene, $C_5$–$C_{12}$-cycloalkylene, $C_5$–$C_{12}$-cycloalkylidene, —O—, —S—, —SO—, $SO_2$ or —CO—, wherein the moulding compositions are characterised in that they conform to VDE/DIN standard 0472, Part 815, that is to say that they contain ≦0.1 wt. % fluorine and ≦0.2 wt. % chlorine, bromine and iodine, in relation to the total composition.

Optionally the compositions may additionally contain

D) a fluorinated polyolefinic compound as a drip-prevention agent,

E) a further polymer component,

F) an inorganic material and

G) conventional polymer additives such as, for example, drip-prevention agents, lubricants and mould release agents, nucleating agents, antistatic agents, stabilisers, dyes and pigments.

The compositions according to the invention are further characterised in that they pass the UL94 V test to the standard V-0, preferably at wall thickness ≦1.55 mm.

The fluorine content is preferably determined by means of the photometric analytical procedure described in DIN/VDE standard 0472, Part 815.

Preferred moulding compositions comprise

A) from 60 to 98 parts by weight, preferably 70 to 95 parts by weight, particularly preferably 75 to 90 parts by weight of at least one aromatic polycarbonate, B) from 0.5 to 30, preferably 1 to 15, particularly preferably 2 to 10 parts by weight of at least one graft polymer having a backbone of rubber, C) from 1 to 20 parts by weight, preferably 2 to 15 parts by weight of a bisphenol A-based oligophosphate, D) from 0 to 0.13 part by weight Teflon, and E) from 0 to 20 parts by weight, preferably 0 to 10 parts by weight, in particular 0 to 5 parts by weight of a vinyl (co)polymer or polyalkylene terephthalate or mixtures thereof, F) from 0 to 5 parts by weight, preferably 0 to 3 parts by weight, in particular 0 to 1.5 parts by weight of a finely divided particulate, flake-form or fibrous inorganic material, wherein the sum of the parts by weight of all the components (A to F and optionally further constituents) is 100.

Most particularly preferred polycarbonate compositions are distinguished in that at wall thickness <1.6 mm they pass the UL94 V test to the standard V-0.

Component A

Aromatic polycarbonates and/or aromatic polyester carbonates corresponding to the component A, which are suitable according to the invention are known from the literature or are preparable by processes known from the literature (for the preparation of aromatic polycarbonates see, for example, Schnell, "Chemistry and Physics of Polycarbonates", Interscience Publishers, 1964 as well as DE-AS 1 495 626, DE-OS 2 232 877, DE-OS 2 703 376, DE-OS 2 714 544, DE-OS 3 000 610, DE-OS 3 832 396; for the preparation of aromatic polyester carbonates, for example DE-OS 3 077 934).

Aromatic polycarbonates are prepared, for example, by reacting diphenols with carbonic acid halides, preferably phosgene, and/or with aromatic dicarboxylic acid dihalides, for example benzene dicarboxylic acid dihalides, by the phase boundary process, optionally with use of chain terminators, for example monophenols, and optionally with use of trifunctional or higher-functional branching agents, for example triphenols or tetraphenols.

Diphenols for the preparation of the aromatic polycarbonates and/or aromatic polyester carbonates are preferably those corresponding to the formula (II)

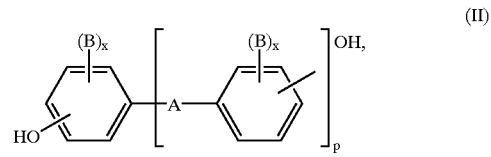

wherein

A is a single bond, $C_1$–$C_5$-alkylene, $C_2$–$C_5$-alkylidene, $C_5$–$C_6$-cycloalkylidene, —O—, —SO—, —CO—, —S—, —SO_2$, $C_6$–$C_{12}$-arylene onto which further aromatic rings optionally containing heteroatoms may be condensed, or a radical corresponding to the formula (III) or (IV)

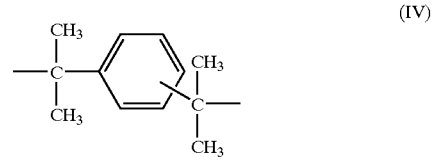

B is in each case $C_1$–$C_{12}$-alkyl, preferably methyl, x is in each case independently of one another 0, 1 or 2, p is 1 or 0, and $R^5$ and $R^6$ for each $X^1$ denote in individually selectable manner independently of one another hydrogen or $C_1$–$C_6$-alkyl, preferably hydrogen, methyl or ethyl, $X^1$ denotes carbon, and m denotes an integer from 4 to 7, preferably 4 or 5, with the proviso that on at least one atom $X^1$, $R^5$ and $R^6$ are at the same time alkyl.

Preferred diphenols are hydroquinone, resorcinol, dihydroxydiphenols; bis(hydroxyphenyl)-$C_1$–$C_5$-alkanes, bis(hydroxyphenyl)-$C_5$–$C_6$-cycloalkanes, bis(hydroxyphenyl) ethers, bis(hydroxyphenyl)sulfoxides, bis(hydroxyphenyl) ketones, bis(hydroxyphenyl)sulfones and α,α-bis(hydroxyphenyl)diisopropylbenzenes.

Particularly preferred diphenols are 4,4'-dihydroxydiphenyl, bisphenol A, 2,4-bis(4-hydroxyphenyl)-2-methylbutane, 1,1-bis(4-hydroxyphenyl)cyclohexane, 1,1-bis(4-hydroxyphenyl)-3,3,5-trimethyl cyclohexane, 4,4'-dihydroxydiphenyl sulfide, 4,4'-dihydroxydiphenyl sulfone.

2,2-bis(4-hydroxyphenyl)propane (bisphenol A) is in particular preferred.

The diphenols may be used either individually or as any mixtures.

The diphenols are known from the literature or are obtainable by processes which are known from the literature.

The following are examples of chain terminators which are suitable for the preparation of the thermoplastic aromatic polycarbonates: phenol and p-tert.-butylphenol, but also long-chain alkyl phenols such as 4-(1,3-tetramethylbutyl) phenol according to DE-OS 2 842 005 or monoalkylphenol or dialkylphenols having a total of 8 to 20 C atoms in the alkyl substituents, such as 3,5-di-tert.butylphenol, p-isooctylphenol, p-tert.octylphenol, p-dodecylphenol and 2-(3, 5-dimethylheptyl)phenol and 4-(3,5-dimethylheptyl)phenol. The quantity of chain terminators to be used is generally between 0.5 mol % and 10 mol %, in relation to the molar sum of the diphenols used in each case.

The thermoplastic aromatic polycarbonates have average weight average molecular weights ($M_w$, measured, for example, by ultracentrifuging or light scattering) of 10 000 to 200 000 g/mol.

The thermoplastic aromatic polycarbonates may be branched in known manner, and preferably by the incorporation of from 0.05 to 2.0 mol %, in relation to the sum of the diphenols used, of trifunctional or higher-functional compounds, for example those such as have three or more phenolic groups.

Both homopolycarbonates and also copolycarbonates are suitable. The copolycarbonates according to the invention corresponding to the component A may also be prepared with the use of from 1 to 25 wt. %, preferably 2.5 to 25 wt. % (in relation to the total quantity of diphenols to be used) of polydiorganosiloxanes having terminal hydroxyaryloxy groups. These are known (see, for example, U.S. Pat. No. 3,419,634) or may be prepared by processes which are known from the literature. The preparation of copolycarbonates which comprise polydiorganosiloxane is described, for example, in DE-OS 3 334 782.

The copolycarbonates of bisphenol A having up to 15 mol %, in relation to the molar sum of the diphenols, of other diphenols named as being preferred or particularly preferred are preferred polycarbonates, in addition to the bisphenol A homopolycarbonates.

Aromatic dicarboxylic acid dihalides for the preparation of aromatic polyester carbonates are preferably diacid dichlorides of isophthalic acid, terephthalic acid, diphenylether-4,4'-dicarboxylic acid and naphthalene-2,6-dicarboxylic acid.

Mixtures of the diacid dichlorides of isophthalic acid and terephthalic acid in a ratio of between 1:20 and 20:1 are particularly preferred.

A carbonic acid halide, preferably phosgene, is additionally co-used as a bifunctional acid derivative in the preparation of polyester carbonates.

In addition to the monophenols already named, the chlorocarbonic esters thereof as well as the acid chlorides of aromatic monocarboxylic acids, which may optionally be substituted with $C_1$–$C_{22}$-alkyl groups, as well as aliphatic $C_2$–$C_{22}$ monocarboxylic acid chlorides, are considered as chain terminators for the preparation of the aromatic polyester carbonates.

The quantity of chain terminators is in each case from 0.1 to 10 mol %, in relation to moles of diphenols, in the case of the phenolic chain terminators, and in relation to moles of dicarboxylic acid dichlorides, in the case of monocarboxylic acid chloride chain terminators.

The aromatic polyester carbonates may also contain incorporated aromatic hydroxycarboxylic acids.

The aromatic polyester carbonates may be linear and also branched in known manner (q.v. also DE-OS 2 940 024 and DE-OS 3 007 934).

The following may be used as branching agents, for example: trifunctional or higher-functional carboxylic acid chlorides such as trimesic acid trichloride, cyanuric acid trichloride, 3,3',4,4'-benzophenone tetracarboxylic acid tetrachloride, 1,4,5,8-naphthalene tetracarboxylic acid tetrachloride or pyromellitic acid tetrachloride, in quantities of from 0.01 to 1.0 mol % (in relation to dicarboxylic acid dichlorides used) or trifunctional or higher-functional phenols such as phloroglucin, 4,6-dimethyl-2,4,6-tri-(4-hydroxyphenyl)heptane, 2,4,4-dimethyl-2,4,6-tri(4-hydroxyphenyl)heptane, 1,3,5-tri-(4-hydroxyphenyl) benzene, 1,1,1-tri-(4-hydroxyphenyl)ethane, tri-(4-hydroxyphenyl)phenylmethane, 2,2-bis[4,4-bis(4-hydroxyphenyl)cyclohexyl]propane, 2,4-bis(4-hydroxyphenyl isopropyl)phenol, tetra-(4-hydroxyphenyl) methane, 2,6-bis(2-hydroxy-5-methylbenzyl)-4-methyl phenol, 2-(4-hydroxyphenyl)2-(2,4-dihydroxyphenyl) propane, tetra-(4-[4-hydroxyphenyl isopropyl]phenoxy) methane, 1,4-bis[4,4'-dihydroxytriphenyl)methyl]benzene, in quantities of from 0.01 to 1.0 mol %, in relation to diphenols used. Phenolic branching agents may be placed in the initial charge with the diphenols, acid chloride branching agents may be introduced together with the acid dichlorides.

The carbonate structural unit content may be varied at will in the thermoplastic aromatic polyester carbonates. The carbonate group content is preferably up to 100 mol %, in particular up to 80 mol %, particularly preferably up to 50 mol %, in relation to the sum of ester groups and carbonate groups. Both the ester content and the carbonate content of the aromatic polyester carbonates may be present in block form or may be distributed in random manner in the polycondensate.

The relative solution viscosity ($\eta_{rel}$) of the aromatic polycarbonates and polyester carbonates is within the range 1.18 to 1.4, preferably within the range 1.26 to 1.4, in particular within the range 1.28 to 1.35 (measured on solutions of 0.5 g polycarbonate or polyester carbonate in 100 ml methylene chloride solution at 25° C.).

The thermoplastic aromatic polycarbonates and polyester carbonates may be used alone or as any intermixture.

Component B

The component B embraces one or more graft polymers prepared from

B.1 from 5 to 95, preferably 30 to 90 wt. % of at least one vinyl monomer on

B.2 from 95 to 5, preferably 70 to 10 wt. % of one or more graft backbones having glass transition temperatures <10° C., preferably <0° C., particularly preferably <−20° C.

The graft backbone B.2 generally has an average particle size ($d_{50}$ value) of from 0.05 to 10 $\mu$m, preferably 0.1 to 5 $\mu$m, particularly preferably 0.2 to 1 $\mu$m.

Monomers B.1 are preferably a mixture prepared from

B.1.1 from 50 to 99 parts by weight vinyl aromatics and/or vinyl aromatics substituted in the ring (such as, for example and preferably, styrene, α-methylstyrene, p-methylstyrene) and/or methacrylic acid ($C_1$–$C_8$)-alkyl esters (such as, for example and preferably, methyl methacrylate, ethyl methacrylate) and B.1.2 from 1 to 50 parts by weight vinyl cyanides (unsaturated nitrites such as, for example and preferably, acrylonitrile and methacrylonitrile) and/or (meth)acrylic acid ($C_1$–$C_8$)-alkyl esters (such as, for example and preferably, methyl methacrylate, n-butylacrylate, t-butylacrylate) and/or derivatives (such as, for example and preferably, anhydrides and imides) of unsaturated carboxylic acids (for example and preferably maleic anhydride and/or N-phenyl maleic imide).

Preferred monomers B.1.1 are selected from among at least one of the monomers styrene, α-methylstyrene and methyl methacrylate, preferred monomers B.1.2 are selected from among at least one of the monomers acrylonitrile, maleic anhydride and methyl methacrylate.

Particularly preferred monomers are B.1.1 styrene and B.1.2 acrylonitrile.

Graft backbones B.2 which are suitable for the graft polymers B are, for example, diene rubbers, EP(D)M rubbers, that is to say rubbers such as are based on ethylene/propylene and optionally diene, as well as acrylic, polyurethane, silicone and ethylene/vinyl acetate rubbers.

Preferred graft backbones B.2 are diene rubbers (for example based on butadiene, isoprene, etc.) or mixtures of diene rubbers or copolymers of diene rubbers or mixtures thereof with further copolymerisable monomers (for example corresponding to B.1.1 and B.1.2), with the proviso that the glass transition temperature of the component B.2 is below <10° C., preferably <0° C., particularly preferably <−10° C.

Pure polybutadiene rubber is particularly preferred.

Particularly preferred polymers B are ABS polymers (emulsion, bulk and suspension ABS), such as are described in, for example, DE-A 2 035 390 (=U.S. Pat. No. 3,644,574) or in DE-A 2 248 242 (=GB-A 1 409 275) or in Ullmann, Enzyklopädie der Technischen Chemie, Vol. 19 (1980), p. 280 et seq. The gel content of the graft backbone B.2 is at least 30 wt. %, preferably at least 40 wt. % (measured in toluene).

The graft copolymers B are prepared by free-radical polymerisation, for example by emulsion, suspension, solution or bulk polymerisation, preferably by emulsion or bulk polymerisation.

Emulsion ABS is particularly preferred as the component B.

ABS polymers such as are prepared by redox initiation with an initiator system prepared from organic hydroperoxide and ascorbic acid according to U.S. Pat. No. 4,937,285 are also in particular suitable graft rubbers.

Since in the grafting reaction the graft monomers are known to be not necessarily grafted completely onto the graft backbone, according to the invention products such as are obtained by (co)polymerisation of the graft monomers in the presence of the graft backbone and co-arise during working-up are also understood to be among graft polymers B.

Suitable acrylic rubbers corresponding to B.2 of the polymers B are preferably polymers of acrylic acid alkyl esters, optionally having up to 40 wt. %, in relation to B.2, of other polymerisable ethylenically unsaturated monomers. $C_1$–$C_8$-alkyl esters, for example methyl, ethyl, butyl, n-octyl and 2-ethylhexyl esters as well as mixtures of these monomers, are among the preferred polymerisable acrylic acid esters.

In order to bring about cross-linking, monomers having more than one polymerisable double bond may be copolymerised. Preferred examples of cross-linking monomers are esters of unsaturated monocarboxylic acids having 3 to 8 C atoms and of unsaturated monohydric alcohols having 3 to 12 C atoms, or of saturated polyols having 2 to 4 OH groups and 2 to 20 C atoms, such as, for example, ethylene glycol dimethacrylate, allyl methacrylate; heterocyclic compounds having multiple unsaturation, such as, for example, trivinyl and triallyl cyanurate; polyfunctional vinyl compounds such as divinyl benzenes and trivinyl benzenes; but also triallyl phosphate and diallyl phthalate.

Preferred cross-linking monomers are allyl methacrylate, ethylene glycol dimethacrylate, diallyl phthalate and heterocyclic compounds having at least 3 ethylenically unsaturated groups.

Particularly preferred cross-linking monomers are the cyclic monomers triallyl cyanurate, triallyl isocyanurate, triacryloyl hexahydro-s-triazine, triallyl benzenes. The quantity of the cross-linking monomers is preferably from 0.02 to 5, in particular 0.05 to 2 wt. %, in relation to the graft backbone B.2.

In the case of cyclic cross-linking monomers having at least 3 ethylenically unsaturated groups it is advantageous to restrict the quantity to less than 1 wt. % of the graft backbone B.2.

Examples of preferred "other" polymerisable ethylenically unsaturated monomers which, in addition to the acrylic acid esters, can optionally serve for the preparation of the graft backbone B.2 are acrylonitrile, styrene, α-methylstyrene, acrylamides, vinyl-$C_1$–$C_8$-alkyl ethers, methyl methacrylate, butadiene. Preferred acrylic rubbers as the graft backbone B.2 are emulsion polymers having a gel content of at least 60 wt. %.

Further suitable graft backbones corresponding to B.2 are silicone rubbers having graft-reactive sites, such as are described in DE-A 3 704 657, DE-A 3 704 655, DE-A 3 631 540 and DE-A 3 631 539.

The gel content of the graft backbone B.2 is determined at 25° C. in a suitable solvent (M. Hoffmann, H. Krömer, R. Kuhn, Polymeranalytik I and II, Georg Thieme-Verlag, Stuttgart 1977).

The average particle size $d_{50}$ is the diameter above and below which, respectively, 50 wt. % of the particles lie. It can be determined by ultracentrifuge measurement (W. Scholtan, H. Lange, Kolloid, Z. und Z. Polymere 250 (1972), 782–1796).

Component C

The moulding compositions according to the invention comprise as the flame-retardant one or more phosphorus compounds corresponding to the formula (I)

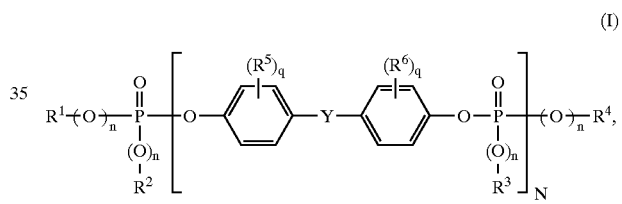

(I)

in which the radicals generally denote the same as described above.

The phosphorus compounds corresponding to the component C which are suitable according to the invention are known (see, for example Ullmann, Enzyklopädie der Technischen Chemie, Vol. 18, p. 301 et seq., 1979; Houben-Weyl, Methoden der Organischen Chemie, Vol. 12/1, p. 43; Beilstein, Vol. 6, p. 177).

Preferred substituents $R^1$ to $R^4$ denote, for example, methyl, propyl, isopropyl, butyl, tert.-butyl, octyl, phenyl, naphthyl, as well as $C_1$–$C_4$-alkyl-substituted aryl such as, for example, cresyl, xylenyl, propylphenyl, butylphenyl and cumyl. Phenyl is particularly preferred.

$R^5$ and $R^6$ preferably denote methyl.

Y preferably stands for $C_1$–$C_7$-alkylene, in particular for isopropylidene or methylene.

q may be 0, 1, 2, 3 or 4, preferably q is 0, 1 or 2.

n may be 0 or 1, preferably n=1.

N may take values of from 0.1 to 30, values of from 0.5 to 10, in particular 0.7 to 5, are preferred. Mixtures of different phosphates corresponding to the formula (I) may also be used as the component C according to the invention. In this case N may take the above-mentioned values as average values. Monophosphorus compounds (N=0) may also be included in the mixtures.

Monophosphorus compounds corresponding to the formula (I) are in particular tributyl phosphate, triphenyl phosphate, tricresyl phosphate, diphenylcresyl phosphate, diphenyloctyl phosphate, diphenyl-2-ethylcresyl phosphate, tri(isopropylphenyl)phosphate, methylphosphonic acid dimethyl ester, methylphosphonic acid diphenyl ester, phenylphosphonic acid diethyl ester, triphenylphosphine oxide or tricresylphosphine oxide. Triphenyl phosphate is the particularly preferred monophosphorus compound.

The averaged N values may be determined by first determining the composition of the phosphate mixture (molecular weight distribution) by means of a suitable method (gas chromatography (GC), high pressure liquid chromatography (HPLC), gel permeation chromatography (GPC)) and calculating from this the average values for N.

Component D

As the component D the compositions according to the invention may also contain fluorinated polyolefins as a drip-prevention agent. The quantity of added fluorinated polyolefin must, however, be sufficiently small as still to meet the requirements of DIN/VDE standard 0472, Part 815, that is to say the fluorine content of the total composition may not exceed 0.1 wt. %.

Fluorinated polyolefins are generally known (cf., for example, EP-A 640 655). An example of a commercially available product is Teflon® 30 N from DuPont.

The fluorinated polyolefins may also be used in the form of a coagulated mixture of emulsions of the fluorinated polyolefins with emulsions of the graft polymers (B) or with an emulsion of a copolymer preferably based on styrene/acrylonitrile, with the fluorinated polyolefin being mixed as an emulsion with an emulsion of the graft polymer or copolymer, respectively, followed by coagulation.

The fluorinated polyolefins may furthermore be used as a pre-compound with the graft polymer (B) or a copolymer preferably based on styrene/acrylonitrile. The fluorinated polyolefins are mixed as powder with a powder or granules of the graft polymer or copolymer, respectively, and are compounded in the melt in conventional units such as internal mixers, extruders or twin-shaft screw units, generally at temperatures of from 200 to 330° C.

The fluorinated polyolefins may also be used in the form of a master batch which is prepared by emulsion polymerisation of at least one monoethylenically unsaturated monomer in the presence of an aqueous dispersion of the fluorinated polyolefin. Preferred monomer components are styrene, acrylonitrile and mixtures thereof. The polymer is used as a free-flowing powder following acid precipitation and subsequent drying.

The coagulates, pre-compounds and master batches generally have solids contents of fluorinated polyolefin of from 5 to 95 wt. %, preferably 7 to 60 wt. %.

Component E

The compositions according to the invention may also contain further polymers as the component (E).

Vinyl (co)polymers (E.1) of at least one monomer from the group comprising vinyl aromatics, vinyl cyanides (unsaturated nitrites), (meth)acrylic acid-($C_1$–$C_8$)-alkyl esters, unsaturated carboxylic acids and derivatives (such as anhydrides and imides) of unsaturated carboxylic acids are suitable. (Co)polymers prepared from E.1.1 from 50 to 99, preferably 60 to 90 parts by weight vinyl aromatics and/or vinyl aromatics substituted in the ring, such as, for example and preferably, styrene, α-methyl styrene, p-methylstyrene) and/or methacrylic acid-($C_1$–$C_8$)-alkyl esters such as, for example and preferably, methyl methacrylate, ethyl methacrylate), and E.1.2 from 1 to 50, preferably 10 to 40 parts by weight vinyl cyanides (unsaturated nitrites) such as acrylonitrile and methacrylonitrile and/or (meth)acrylic acid-($C_1$–$C_8$)-alkyl esters (such as, for example and preferably, methyl methacrylate, n-butylacrylate, t-butylacrylate) and/or unsaturated carboxylic acids (such as, for example and preferably, maleic acid) and/or derivatives (such as, for example and preferably, anhydrides and imides) of unsaturated carboxylic acids (for example and preferably, maleic anhydride and N-phenyl maleic imide)

are in particular suitable.

The (co)polymers E.1 are resinous, thermoplastic and rubber-free.

The copolymer prepared from E.1.1 styrene and E.1.2 acrylonitrile is particularly preferred.

The (co)polymers corresponding to E.1 are known and can be prepared by free-radical polymerisation, in particular by emulsion, suspension, solution or bulk polymerisation. The (co)polymers corresponding to the component E.1 preferably have molecular weights $M_w$ (weight average, determined by light scattering or sedimentation) of between 15 000 and 200 000.

Polyalkylene terephthalates (E.2) such as are described in EP-A-841 187 are furthermore suitable.

Polyalkylene terephthalates which have been prepared from terephthalic acid and/or reactive derivatives thereof (for example dialkyl esters thereof) and ethylene glycol and/or 1,4-butanediol, and mixtures of these polyalkylene terephthalates are preferred.

Component F

There may furthermore be added to the polycarbonate composition inorganic materials, in particular those such as by virtue of a thixotropic effect improve the melt stability, in quantities such as to affect the mechanical properties of the material positively or at least not negatively. In principle, any finely ground inorganic materials are considered for this purpose. These may be, for example, particulate, flake-form or fibrous in character. Chalk, powdered quartz, titanium dioxide, silicates/aluminosilicates such as, for example, talc, wollastonite, mica/layer-lattice clay minerals, montmorillonite, in particular also in an organophilic form modified by ion exchange, kaolin, zeolites, vermiculite as well as aluminium oxide, silica, magnesium hydroxide, aluminium hydroxide and glass fibres/glass flakes might be named at this point. Mixtures of different inorganic materials may also be used.

The inorganic materials may be surface-treated, for example silanised, in order to afford better polymer compatibility.

The inorganic materials are used at concentrations of from 0 to 5 wt. %, preferably 0 to 3 wt. %, in particular 0 to 1.5 wt. %, in relation to the total composition.

Inorganic materials having a flake-form character such as, for example, talc, mica/layer-lattice clay minerals, montmorillonite, in particular also in an organophilic form modified by ion exchange, kaolin and vermiculite, are preferably used.

Talc is particularly preferred.

Talc is understood to be a naturally occurring or synthetically prepared talc.

Pure talc has the chemical composition $3MgO.4SiO_2.H_2O$ and consequently an MgO content of 31.9 wt. %, an $SiO_2$ content of 63.4 wt. % and a chemically bound water content of 4.8 wt. %. It is a layer-lattice structured silicate.

Naturally occurring talc materials generally do not have the ideal composition described above because they are contaminated as a result of partial exchange of the magnesium by other elements, partial exchange of silicon by, for example, aluminium, and/or by intergrowth with other minerals such as, for example, dolomite, magnesite and chlorite. These contaminated natural talc powders may also be used in the moulding compositions according to the invention, however highly pure talc grades are preferred. These are characterised by an MgO content of from 28 to 35 wt. %, preferably 30 to 33 wt. %, particularly preferably 30.5 to 32 wt. %, and an $SiO_2$ content of from 55 to 65 wt. %, preferably 58 to 64 wt. %, particularly preferably 60 to 62.5 wt. %. Preferred talc grades are furthermore distinguished by an $Al_2O_3$ content of less than 5 wt. %, particularly preferably less than 1 wt. %, in particular less than 0.7 wt. %.

The use of talc in the form of finely ground grades having an average particle size $d_{50}$ of <20 μm, preferably <10 μm, particularly preferably <5 μm, most particularly preferably ≦2.5 μm, is in particular advantageous.

Extremely finely divided (nanoscale) inorganic compounds of one or more metals of the 1st to the 5th main groups and the 1st to 8th sub-groups of the Periodic Table, preferably the 2nd to 5th main groups and the 4th to 8th sub-groups, particularly preferably the 3rd to 5th main groups and the 4th to 8th subgroups, with the elements oxygen, sulfur, boron, phosphorus, carbon, nitrogen, hydrogen and silicon, might be named in addition as preferred inorganic components.

Preferred compounds are, for example, oxides, hydroxides, hydrated/basic oxides, sulfates, sulfites, sulfides, carbonates, carbides, nitrates, nitrites, nitrides, borates, silicates, phosphates and hydrides.

Particularly preferred extremely finely divided inorganic compounds are, for example, TiN, $TiO_2$, $SnO_2$, WC, ZnO, $Al_2O_3$, AlO(OH), $ZrO_2$, $SiO_2$, iron oxides, $BaSO_4$, vanadium oxides, zinc borate, silicates such as aluminium silicates. magnesium silicates. Mixtures and/or doped compounds can also be used. The nanoscale particles may be surface-modified with organic molecules.

Nanoscale AlO(OH) is in particular preferred.

The average particle diameters of the nanoscale inorganic materials are smaller than or equal to 200 nm, preferably smaller than or equal to 150 nm, in particular 1 to 100 nm.

The particle size and particle diameter always denote the average particle diameter $d_{50}$, determined by ultracentrifuge measurements in accordance with W. Scholtan et al., Kolloid-Z. und Z. Polymere 250 (1972), pp. 782–796.

The nanoscale inorganic compounds may be present as powders, pastes, sols, dispersions or suspensions. Powders can be obtained by precipitation from dispersions, sols or suspensions.

Component G

The moulding compositions according to the invention may contain at an effective concentration further conventional additives such as, for example, drip-prevention agents differing from the component (D), flame retardants differing from the component (C), lubricants and mould release agents, nucleating agents, antistatic agents, stabilisers, dyes and pigments.

The moulding compositions according to the invention containing the components A–G and optionally further additions are prepared by mixing the respective constituents in known manner and melt-compounding or melt-extruding in conventional units such as internal mixers, extruders and twin-shaft screw units at temperatures from 200° C to 300° C.

The individual constituents may be mixed in known manner both successively and also simultaneously, both at approximately 20° C. (room temperature) and also at a higher temperature.

The thermoplastic moulding compositions according to the invention are by virtue of their excellent flame resistance, good mechanical properties and good processing characteristics suitable for producing mouldings of every type, in particular of course those required to conform to DIN/VDE standard 0472, Part 815. The mouldings may be produced by the known processes, for example injection moulding and extrusion.

The moulding compositions according to the invention are by virtue of their rheological properties also suitable in particular for producing sheets, profiles and mouldings by the extrusion, extrusion blow moulding and thermoforming processes.

Examples of mouldings which can be produced are: housing components of all types, for example for domestic appliances such as juice presses, coffee machines, mixers; for electric motors such as those in lawn mowers, drilling machines, etc. as well as for office machines such as monitors, (portable) computers, printers and copiers. Further potential applications are cover plates, window/door profiles as well as electrical installation ducts/tubes, cable conduits and wiring ducts, bus-bar covers as well as moulded parts, extruded profiles or sheets for the automotive/rail vehicle/aircraft sectors (for example interior panelling). The moulding compositions are furthermore usable in the field of electrical engineering, for example for switches, sockets and circuit boards as well as for distribution cabinets and current metering cabinets.

The present invention further provides processes for the preparation of the composition, use of the composition for producing mouldings as well as the mouldings themselves.

EXAMPLES

Component A

Branched polycarbonate based on bisphenol A, having a relative solution viscosity of 1.32, measured in methylene chloride at 25° C. and at a concentration of 0.5 g/100 ml.

Component B

Graft polymer prepared by emulsion polymerisation from 45 parts by weight styrene and acrylonitrile in the ratio 72:28 on 55 parts by weight of a particulate cross-linked polybutadiene rubber (average particle diameter $d_{50}$=0.3 to 0.4 μm).

Component C.1

Bisphenol A-based oligophosphate

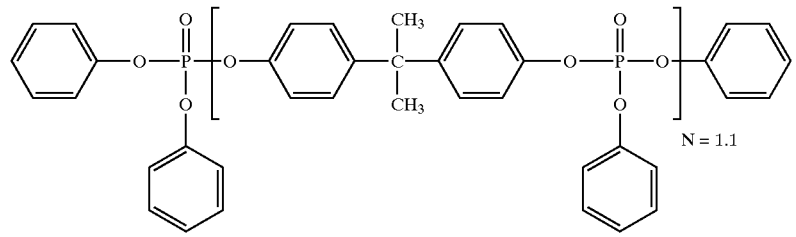

Component C.2
Resorcinol-based oligophosphate (Comparison)

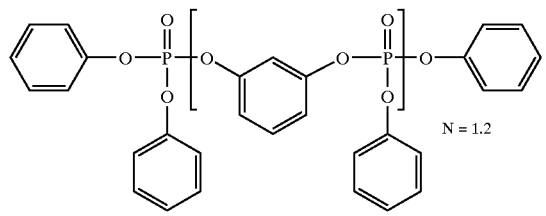

In order to determine the indicated numerically averaged N values of the components C.1 and C.2, the oligomeric phosphate contents were first determined by HPLC measurements:

Type of column: LiChrosorp RP-8
Eluent in the gradient: acetonitrile/water 50:50 to 100:0
Concentration: 5 mg/ml The numerically weighted N average values were then calculated by known methods from the individual component (monophosphates and oligophosphates) contents.

Component D.1

The polytetrafluoroethylene preparation (D.1) is prepared by co-precipitation of a mixture of aqueous emulsions of the graft polymer (B) and a tetrafluoroethylene polymer. The ratio by weight of graft polymer (B) to tetrafluoroethylene polymer in the coagulate is from 90 wt. % to 10 wt. %. The tetrafluoroethylene polymer emulsion has a solids content of 60 wt. %, the average PTFE particle diameter is between 0.05 and 0.5 μm. The graft polymer emulsion has a solids content of 34 wt. % and an average latex particle diameter of from 0.3 to 0.4 μm.

In order to prepare (D.1) the emulsion of tetrafluoroethylene polymer (Teflon 30 N from DuPont) is mixed with the emulsion of the graft polymer (B) and is stabilised with 1.8 wt. %, in relation to polymer solids, of phenolic antioxidants. The mixture is coagulated at from 85 to 95° C. with an aqueous solution of $MgSO_4$ (Epsom salt) and acetic acid at pH 4 to 5, filtered and washed until virtually free of electrolyte, the majority of the water is then removed by centrifuging, and drying to a powder follows at 100° C.

Component D.2

Blendex 449: pulverulent PTFE preparation from General Electric Plastics, consisting of 50 wt. % PTFE in an SAN copolymer matrix.

Component F.1

Naintsch A3: extremely finely ground highly pure talc from Naintsch Mineralwerke GmbH (Graz, Austria).

Component F.2

Pural 200: nanoscale AlO(OH) of boehmite structure from Condea Chemie GmbH (Hamburg, Germany).

Component G.1

Phosphite stabiliser

Component G.2

Pentaerythritol tetrastearate as the mould release agent.

Preparation and Testing of the Moulding Compositions According to the Invention

The components A to G were mixed on a ZSK 25 laboratory extruder (Werner & Pfleiderer) at a material temperature of 260° C., a throughput of 15 kg/h and a screw rotation frequency of 200 r.p.m. The mouldings were produced on an injection moulding machine (Arburg 270E model) at 260° C.

The resistance to stress cracking is investigated on 80×10×4 mm rods. A mixture of 60 vol. % toluene and 40 vol. % isopropanol is used as the test medium. The test specimens are pre-stretched (0.2 to 2.4% pre-stretching) by means of an arc-shaped jig and are stored in the test medium for 5 minutes at room temperature. The resistance to stress cracking is evaluated by way of the minimum outer fibre strain necessary to break the rod in the test medium within the 5-minute exposure time.

The notched impact strength ($a_k$) is determined at room temperature in accordance with ISO 180-1A.

The Vicat B 120 temperature is determined in accordance with ISO 306 with a heat-up rate of 120 K/h and 50 N piston loading.

The flame resistance is evaluated in accordance with UL94 V on 1.2 and 1.5 mm-thick rods.

The melt viscosity in the low shear region (shear rate of $100/s^{-1}$) is determined as a measure of the melt stability during extrusion processing in accordance with DIN 54811 at 260° C.

The melt volume rate (MVR) is determined in accordance with ISO 1133 at 260° C. with a piston loading of 5 kg.

TABLE 1

Composition and properties

| Example/ components | | V1* | V2* | V3* | 1 | 2 | 3 | 4 |
|---|---|---|---|---|---|---|---|---|
| A | Polycarbonate | 84.2 | 84.2 | 84.2 | 84.2 | 84.2 | 84.2 | 82.75 |
| B | Graft polymer | 3.5 | 3.5 | 3.5 | 3.5 | 3.5 | 3.5 | 6.0 |
| C.1 | BDP | — | — | — | 10.0 | 10.0 | 10.0 | 10.0 |
| C.2 | RDP | 10.0 | 10.0 | 10.0 | — | — | — | — |
| D.1 | PTFE preparation (10%) | 1.3 | 1.3 | 1.3 | 1.3 | 1.3 | 1.3 | — |
| D.2 | PTFE preparation (50%) | — | — | — | — | — | — | 0.25 |
| F.1 | Talc | — | 0.7 | — | — | 0.7 | — | — |
| F.2 | Nanoscale AlO(OH) | — | — | 0.7 | — | — | 0.7 | — |
| G.1 | Stabiliser | 0.1 | 0.1 | 0.1 | 0.1 | 0.1 | 0.1 | 0.1 |
| G.2 | Mould release agent | 0.2 | 0.2 | 0.2 | 0.2 | 0.2 | 0.2 | 0.2 |
| Properties ESC | Outer fibre strain at break [%] | 0.6 | 1.0 | 0.8 | 1.4 | 2.2 | 1.8 | 1.8 |
| $a_k$ (23° C.) | [kJ/m$^2$] | 14.0 | 16.4 | 13.8 | 15.5 | 37.4 | 28.8 | 48.2 |
| Vicat B 120 | [° C.] | 108 | 106 | 107 | 117 | 115 | 115 | 112 |
| MVR [260° C./5 kg] | [ml/10 min] | 15.0 | 12.5 | 12.3 | 10.4 | 8.8 | 9.4 | 9.2 |
| Melt viscosity [260° C., 100/s$^{-1}$] | [Pa · s] | 772 | 933 | 980 | 1127 | 1236 | 1245 | 1227 |
| UL94 V at 1.5 mm | Standard (total combustion time) | V-0 (5 s) | V-0 (7 s) | V-0 (3 s) | V-0 (6 s) | V-0 (7 s) | V-0 (2 s) | V-0 (10 s) |
| UL94 V at 1.2 mm | Standard (total combustion time) | V-0 (17 s) | V-0 (17 s) | V-0 (22 s) | V-0 (24 s) | V-0 (8 s) | V-0 (19 s) | V-0 (21 s) |

*Comparison test

It is apparent from Table 1 that the use of bisphenol A-based oligophosphate (Examples 1 to 3) in place of resorcinol-based oligophosphate (Comparison Examples V1 to V3) enables a) heat resistance to be improved,
b) resistance to ESC to be improved markedly,
c) notched impact strength to be improved and
d) melt stability to be improved markedly with regard to extrusion applications.

The flame resistance remains unchanged at a good level. The Teflon content of all the Examples and Comparison Examples conforms to the restrictions imposed by DIN/VDE standard 0472, Part 815.

Table 1 shows in addition that the addition of small quantities of inorganic materials such as, for example, talc or nanoscale AlO(OH) enables a further improvement to be achieved in notched impact strength, resistance to ESC and melt stability, and also, in the case of talc, even in flame resistance. A corresponding improvement in the mechanical and rheological properties can, however, also be achieved even without the addition of inorganic materials, by increasing the graft polymer content (Example 4).

What is claimed is:

1. A composition containing at least one polycarbonate, at least one impact modifier, an inorganic material in the form of particulates, flakes or fibers and at least one flame retardant corresponds to the general formula

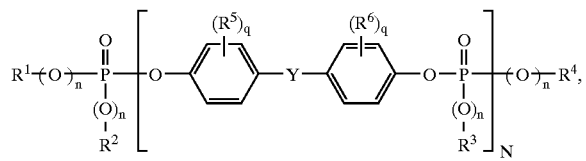

(I)

in which $R^1$, $R^2$, $R^3$ and $R^4$ in each case independently of one another denote $C_1$–$C_8$-alkyl optionally alkyl-substituted $C_5$–$C_6$-cycloalkyl, $C_6$–$C_{10}$-aryl or $C_7$–$C_{12}$-aralkyl, n independently of one another denotes 0 or 1, q independently of one another denotes 0, 1, 2, 3 or 4, N denotes a number between 0.1 and 30, $R^5$ and $R^6$ independently of one another denote $C_1$–$C_4$-alkyl, and Y denotes $C_1$–$C_7$-alkylidene, $C_1$–$C_7$-alkylene, $C_5$–$C_{12}$-cycloalkylene, $C_5$–$C_{12}$-cycloalkylidene, —O—, —S—, —SO—, $SO_2$ or —CO—, wherein the molding composition is characterized in that it contain ≦0.1 wt. % fluorine, in relation to the total composition and wherein the polycarbonate is aromatic and is present in the composition in an amount of 60 to 98 wt. %, and the impact modifier is a graft polymer present in an amount of 0.5 to 30 wt. %, and the flame retardant is present in an amount of 1 to 20 wt. % and wherein inorganic said material is talc wherein said member is present, and is present in an amount of up to 5 wt. % wherein the sum of the wt. % of the components is 100, said talc having $Al_2O_3$ content of ≦1 wt. %, in relation to the talc.

2. The composition of claim 1 wherein said member is said talc.

3. Compositions according to claim 1 wherein the talc has an average particle diameter $d_{50}$≦2.5 μm.

4. Compositions according to claim 1 wherein the talc has an average particle diameter ≦100 nm.

5. Polycarbonate moulding compositions according to claim 1 characterised in that they pass the UL94 V test to the standard V-0 at wall thickness ≦1.5 mm.

6. Polycarbonate moulding compositions according to claim 1 characterised in that the chlorine, bromine and iodine content, in relation to the total composition, is ≦0.2 wt. %.

7. The composition of claim 1 wherein said member is said nanoscale ALO(OH).

8. The composition of claim 7 wherein the average particle diameter of said nanoscale ALO(OH) is smaller than or equal to 200 nm.

9. A molded article comprising the composition of claim 1.

* * * * *